US012724689B2

(12) United States Patent
Koenig et al.

(10) Patent No.: US 12,724,689 B2
(45) Date of Patent: Sep. 1, 2026

(54) COMPUTER-IMPLEMENTED METHOD AND SYSTEM FOR GENERATING TEST DATA FOR COMPUTER-IMPLEMENTED AUTOMATED DRIVING FUNCTIONS

(71) Applicant: Robert Bosch GmbH, Stuttgart (DE)

(72) Inventors: Lukas Koenig, Grossbottwar (DE); Michael Messer, Adolzfurt (DE); Michael Hanselmann, Korntal-Muenchingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 224 days.

(21) Appl. No.: 18/526,593

(22) Filed: Dec. 1, 2023

(65) Prior Publication Data

US 2024/0193071 A1 Jun. 13, 2024

(30) Foreign Application Priority Data

Dec. 7, 2022 (DE) ..................... 10 2022 213 193.2

(51) Int. Cl.
*G06F 11/3604* (2025.01)

(52) U.S. Cl.
CPC ................................ *G06F 11/3608* (2013.01)

(58) Field of Classification Search
CPC .................................................. G06F 11/3608
See application file for complete search history.

(56) References Cited

U.S. PATENT DOCUMENTS 10,255,168 B2 * 4/2019 Stefan ................. G06F 11/3604
11,030,364 B2 * 6/2021 Sholingar ............... G06F 30/15
(Continued)

FOREIGN PATENT DOCUMENTS

DE 102006059829 A1 6/2008
WO WO-2022140251 A1 * 6/2022 .......... G06F 11/3698
WO WO-2024065080 A1 * 4/2024 .......... B60W 30/165

OTHER PUBLICATIONS

Fritzsch, Jonas, Tobias Schmid, and Stefan Wagner. "Experiences from large-scale model checking: Verifying a vehicle control system with nusmv." 2021 14th IEEE Conference on Software Testing, Verification and Validation (ICST). IEEE, 2021.*
(Continued)

*Primary Examiner* — Francisco J Aponte
(74) *Attorney, Agent, or Firm* — NORTON ROSE FULBRIGHT US LLP

(57) ABSTRACT

A computer-implemented method for generating test data for computer-implemented automated driving functions. The method includes: provision of a computer-implemented automated driving function in the form of a software component; specification of an environment model with boundary conditions that limit the state space of the software component; provision of a model checker representation of the software component that is limited by the environment model; specification of a formal requirement as an input for a model checking method; and application of the model checking method to the model checker representation to analyze the software component with respect to compliance with the specified formal requirement. If the specified formal requirement is not complied with, the model checking method provides the states and state transitions of the software component that contribute to non-compliance as edge case parameters. Based on the edge case parameters, test data are then generated.

5 Claims, 2 Drawing Sheets

(56) References Cited

U.S. PATENT DOCUMENTS

| | | | | |
|---|---|---|---|---|
| 11,755,469 | B2 * | 9/2023 | Atmeh | G06F 11/3476<br>701/32.8 |
| 11,808,582 | B1 * | 11/2023 | Dolan | G01C 21/34 |
| 11,814,059 | B1 * | 11/2023 | Reschka | B60W 40/09 |
| 11,904,905 | B2 * | 2/2024 | Donderici | B60W 60/0016 |
| 11,945,465 | B2 * | 4/2024 | Liu | B60W 40/09 |
| 12,037,013 | B1 * | 7/2024 | Linscott | G06N 20/00 |
| 12,162,502 | B2 * | 12/2024 | Zhu | B60W 30/162 |
| 2019/0130056 | A1 * | 5/2019 | Tascione | G06F 30/20 |
| 2019/0310649 | A1 * | 10/2019 | Halder | G06N 3/006 |
| 2019/0310654 | A1 * | 10/2019 | Halder | B60W 60/00 |
| 2019/0324458 | A1 * | 10/2019 | Sadeghi | G05D 1/0276 |
| 2020/0377109 | A1 * | 12/2020 | Yang | B60W 10/10 |
| 2021/0049243 | A1 * | 2/2021 | Venkatadri | G06N 5/04 |
| 2021/0190508 | A1 * | 6/2021 | Alsharif | G06F 9/4843 |
| 2022/0315052 | A1 * | 10/2022 | Oboril | B60W 60/00274 |
| 2023/0043905 | A1 * | 2/2023 | Zhu | B60W 50/0205 |
| 2024/0037015 | A1 * | 2/2024 | Heinzemann | B60W 50/045 |
| 2024/0092386 | A1 * | 3/2024 | Donderici | B60W 50/0098 |
| 2024/0095151 | A1 * | 3/2024 | Ramakrishnan | G06F 11/3676 |

OTHER PUBLICATIONS

Buzhinsky, Igor, and Valeriy Vyatkin. “Testing automation systems by means of model checking.” 2017 22nd IEEE International Conference on Emerging Technologies and Factory Automation (ETFA). IEEE, 2017.*

Spin, “Verifying Multi-Threaded Software With Spin,” Spinroot, 1991, pp. 1-3. <http://spinroot.com/spin/whatisspin.html>.

NUSMV: A New Symbolic Model Checker,“NUSMV, pp. 1-4. http://nusmv.fbk.eu/” Downloaded Jun. 29, 2023.

* cited by examiner

COMPUTER-IMPLEMENTED METHOD AND SYSTEM FOR GENERATING TEST DATA FOR COMPUTER-IMPLEMENTED AUTOMATED DRIVING FUNCTIONS

CROSS REFERENCE

The present application claims the benefit under 35 U.S.C. § 119 of German Patent Application No. DE 10 2022 213 193.2 filed on Dec. 7, 2022, which is expressly incorporated herein by reference in its entirety.

FIELD

The present invention relates to a computer-implemented method and to a system designed therefor for generating test data for computer-implemented automated driving functions.

BACKGROUND INFORMATION

An important part of the development process of computer-implemented automated driving functions, such as behavior planners, fusion algorithms and other control modules, is the testing of the individual software components and the overall system. One focus of these tests is to check whether the functions of the software component have been implemented correctly, i.e., whether the software component delivers the intended results in all conceivable situations and constellations. In practice, simulation-based tests or replay HiL solutions are usually used for this checking. This requires qualified test data, i.e. input data for the software component that describe possible driving situations. These test data can be used to check whether the software component exhibits the desired behavior in the relevant driving situation. This involves checking whether the corresponding results of the software component fulfill the specified requirements. Consequently, the more test data are available and the more different driving situations they cover, the more meaningful the test result will be. In this connection, it is particularly difficult to cover "critical" situations that occur very rarely but have a high significance in terms of the requirements to be tested, in particular with regard to critical safety requirements. Both the "generation" in the simulation and the "provocation" in real test drives of test cases that test peripheral regions of the software are a difficult and typically expensive undertaking. This means that dangerous situations only occur very rarely on real journeys. For the simulation, such situations have to be laboriously identified and constructed.

Model checking is a verification method that can provide automatic proof of whether a software component is fulfilling a formal requirement, i.e., always delivers the intended results. A prerequisite for the applicability of a model checking method is the translation of the program code of the software component into a suitable model checker representation. By applying the model checking method to the model checker representation, all possible sequences in the program of the software component are analyzed and checked to see whether or not a formal requirement is fulfilled in all possible cases. In this way, the correctness of the program code of the software component can be verified.

Examples of corresponding tools for model checking are Spin (http://spinroot.com/spin/whatispin.html) NuSMV (http://nusmv.fbk.eu/)

SUMMARY

According to the present invention, it is provided to use model checking to generate test data for computer-implemented automated driving functions, in particular to generate test data covering very rarely occurring driving situations, so-called "edge cases."

For this purpose, the computer-implemented method according to an example embodiment of the present invention comprises the following steps:

- provision of a computer-implemented automated driving function in the form of a software component,
- specification of an environment model with boundary conditions that limit the state space of the software component,
- provision of a model checker representation of the software component that is limited by the environment model,
- specification of a formal requirement as an input for a model checking method and
- application of the model checking method to the model checker representation to analyze the software component with respect to compliance with the specified formal requirement.

If the specified formal requirement is not complied with, the model checking method identifies the states and state transitions of the software component that contribute to non-compliance and provides this information as edge case parameters.

According to an example embodiment of the present invention, test data are then generated on the basis of these edge case parameters, for example in a correspondingly designed simulation method. In this way, the edge case parameters can be used as the basis for a visualization, which is referred to as "counter example replay."

The environment model is taken into account when translating the native program code into a model checker representation of the software component, namely in such a way that the model checker representation is limited by the boundary conditions of the environment model. This means that, in addition to the specified formal requirement, boundary conditions are taken into account when analyzing the software component, in particular boundary conditions that vary in time and location, as are typical for driving situations. For example, the environment model could provide map information in order to rule out lane changes in certain regions, such as lane mergers or intersections.

It should be noted at this point that the environment model is preferably used to describe boundary conditions over which the user of the automated driving function has no or at most indirect influence. These include environmental conditions, such as light and weather conditions or road conditions, but above all the behavior of other road users. The formal requirements will relate more to the user himself, i.e., the driving behavior of the ego vehicle, such as the vehicle speed and particular driving maneuvers. Not every external influence that affects the behavior of the automated driving function can be clearly assigned to a formal requirement or an environment model. This means that some influencing parameters can be taken into account both as part of the formal requirement and as part of an environment model.

Although the method according to an example embodiment of the present invention requires a model checking analysis of a computer-implemented driving function, it actually only concerns those cases in which the proof of correctness has failed. In these cases, the model checking method not only provides the information that the program code or the software component does not comply with the specified requirement, but also the corresponding counter-example in the form of states and state transitions of the software component that have contributed to non-compliance. These states and state transitions describe the corresponding driving situation.

According to the present invention, it has been recognized that, in this way, driving situations with high informative value can be easily identified with regard to the requirements to be tested. Furthermore, it has been recognized that the description of these rare but highly relevant driving situations-edge cases-provided by the model checking method can be used to generate universally applicable test data. These test data can be used, for example, as part of simulation-based tests or replay HiL solutions for testing any driving functions.

Due to the complexity of automated driving functions, the corresponding software components are not usually verified and validated exclusively by model checking. In fact, model checking must always be seen as a technology that is complementary to testing.

For at least the following reasons, it is sensible to generate test data to cover a situation that has already been examined by model checking:

- The environment model used in model checking is typically much more abstract than is the case in a simulation or in real driving. Consequently, even if the software component complies with the formal requirement, it could deliver false negatives, i.e. overlook errors that could have been detected with a finer granularity of the environment representation.
- The test data generated according to the present invention can be used to test code that cannot, in principle, be model-checked. For example, the test data could have been generated during model checking of a rule-based behavior planner and could now be used for better test coverage in a machine learning-based planner. Model checking is not suitable for machine learning-based planners.
- In principle, the test data generated according to the present invention can contribute to a better coverage of the search space for the traditional test methods. This is particularly important if model checking cannot be used, for example if the state spaces of an automated driving function become very large or for other reasons of time restrictions.

In an advantageous further development of the method according to the present invention, a formal requirement modified in a defined manner is generated if the specified formal requirement is complied with. The model checking method is then applied again to the model checker representation of the software component, wherein the modified formal requirement is specified as an input for the model checking method.

In this way, edge cases can be generated in a targeted manner, for example by successively tightening the formal requirement or by including additional criteria in the criteria catalog of a formal requirement.

Alternatively or additionally, in a further embodiment of the present invention, an environment model modified in a defined manner is generated if the specified formal requirement is complied with. A modified model checker representation of the software component is then provided, which is limited by the boundary conditions of the modified environment model. Finally, the model checking method is applied to the modified model checker representation to analyze the software component with the boundary conditions of the modified environment model with respect to compliance with the specified formal requirement.

Edge cases can also be generated in a targeted manner by modifying the environment model appropriately.

Regardless of the form in which the environment model is provided, a defined modification of the environment model can be carried out, for example by targeted replacement. Pre-created environment models can be retrieved from a corresponding database for this purpose.

In an advantageous further development of the present invention, the environment model is provided in the form of a native environment model program code and environment parameters. In this case, the environment model can be modified by specifically modifying the environment program code and/or the environment parameters in a defined manner.

According to an example embodiment of the present invention, it is also advantageous if the model checker representation of the software component is generated automatically, taking into account the environment model. Details of this are explained below in conjunction with FIG. 1.

In addition to the computer-implemented method, a computer-implemented system for generating test data for computer-implemented automated driving functions is also provided. According to an example embodiment of the present invention, such a system comprises:

- a computer-implemented automated driving function in the form of a software component,
- an environment modeling module for providing an environment model that limits the state space of the software component by specifiable boundary conditions,
- a translation module for translating the native program code of the software component into a model checker representation of the software component, taking into account the environment model, such that the model checker representation is limited by the boundary conditions of the environment model,
- an input module for specifying an optionally modifiable formal requirement for the model checking method,
- a model checker module for applying a model checking method to the model checker representation to analyze the software component with respect to compliance with the specified formal requirement, wherein the model checker module is designed to provide the states and state transitions of the software component that contribute to non-compliance as edge case parameters if the formal requirement is not complied with, and
- a simulation module that is designed to generate test data on the basis of edge case parameters.

Some advantages of the measures according to the present invention for generating test data for computer-implemented automated driving functions can be summarized as follows:

- Relevant test cases are identified automatically, without the need for human creativity to come up with the most relevant scenarios.
- The test cases identified are typically particularly difficult cases or cases that people would not have thought of ("edge cases"), because model checking also looks at peripheral regions of the system variables.
- The test data is also generated fully automatically, such that the method according to the present invention can be integrated as a whole into a continuous integration (CI) pipeline.
- In principle, the generated test cases/test data can be automatically integrated into simulation tests.

BRIEF DESCRIPTION OF THE DRAWINGS

Exemplary embodiments and advantageous further developments of the present invention are explained in more detail below with reference to the figures.

DETAILED DESCRIPTION OF EXAMPLE EMBODIMENTS

Figure 1:
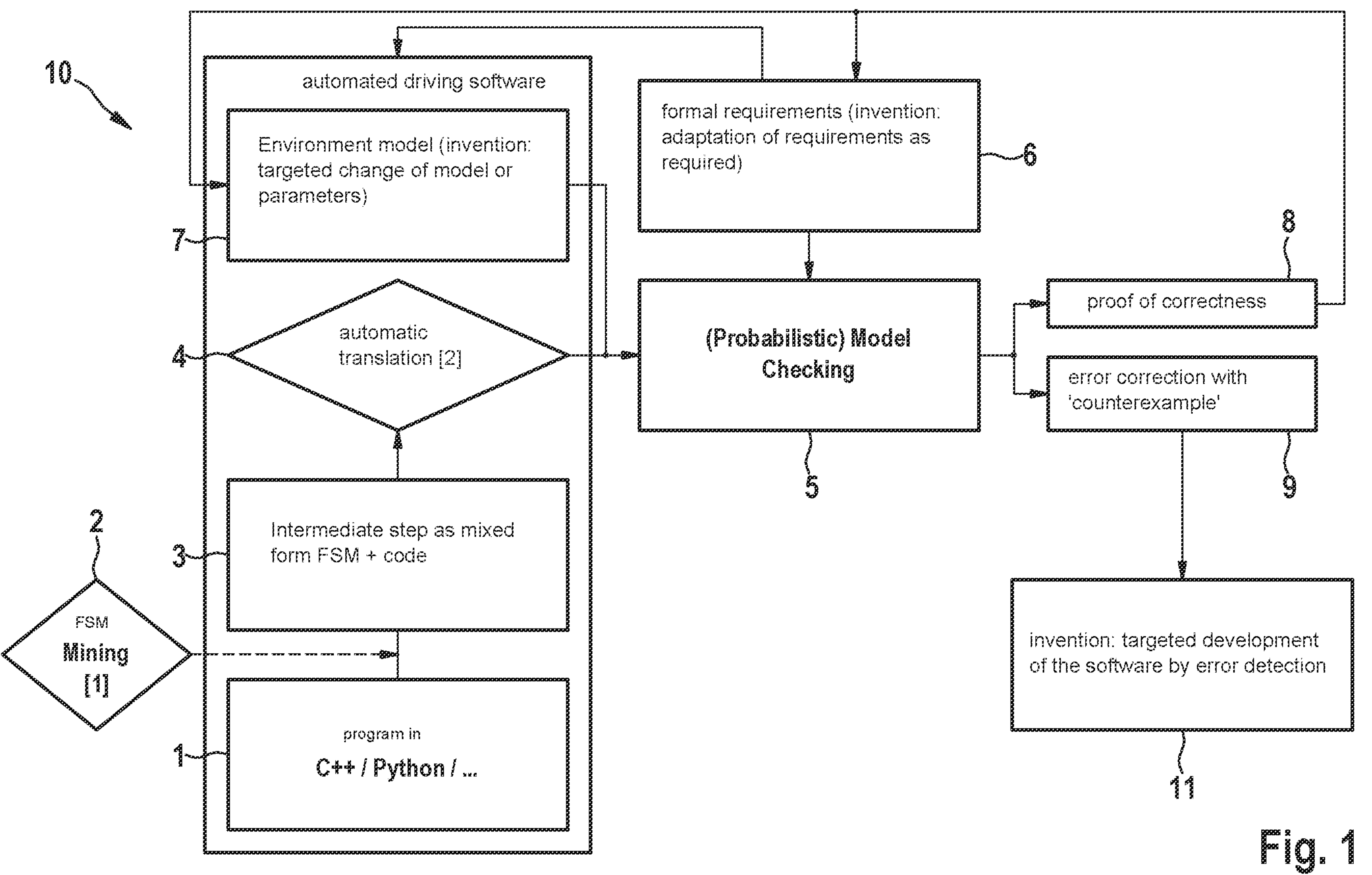
FIG. 1 shows a block diagram that illustrates the operation of a system 10 according to an example embodiment of the present invention for generating test data for computer-implemented automated driving functions.

FIG. 1 shows a system 10 for generating test data for computer-implemented automated driving functions and illustrates the application proposed according to the present invention of model checking methods for generating such test data.

The starting point for this is a software component that is available in the form of native program code 1. This software component implements an automated driving function, for example planning a lane change or an overtaking maneuver.

The system 10 comprises an environment modeling module 7, which models the physical properties of the environment, the driving behavior of other road users and other external system parameters and specifies them in the form of an environment model. Advantageously, the environment modeling module 7 is designed in such a way that it can automatically modify the environment model according to defined specifications, for example by changing model parameters or by providing different environment models from a database. The specified environment model generates boundary conditions that limit the state space of the software component.

The method according to the present invention provides for the provision of a model checker representation of the software component that is limited by the environment model. Advantageously—but not necessarily—this "translation" takes place automatically. In the exemplary embodiment described here, the system 10 comprises a transmission module for this purpose. Here, the translation takes place in two steps in blocks 2 and 4, in such a way that the code structure of the native program code 1 is substantially retained in the model checker representation.

The prerequisite for fully automating the translation of the native program code into a model checker representation is that the native program code only contains operations that can themselves be represented as a finite state machine. Accordingly, the native program code 1 for the application of the development tool according to the present invention may not use all available operations of the particular programming language, but only a subset of the available operations. In the case of C++ or Python programs, for example, all loop/go-to/recursion structures are dispensed with.

The native program code 1 is initially converted into a finite state machine (FSM), the states and state transitions of which can be clearly assigned to the code structure of the native program code, in order to then generate a model checker representation on the basis of this finite state machine, such that the code structure of the native program code is substantially retained upon translation into the model checker representation.

It should be noted at this point that, in certain cases, the finite state machine generated in this way can already be used as a model checker representation, i.e. as an input for the model checker. In these cases, no further translation step is required.

In the exemplary embodiment according to FIG. 1, the native program code 1 is converted into a finite state machine in two steps. In the first step, so-called mining—block 2, FSM-like structures of a certain type are detected in the native program code. The automatically detected FSM-like program structures are—also automatically—assigned corresponding FSM states and FSM state transitions. This generates an intermediate representation 3 of the native program code. This intermediate representation 3 already has the structure of a finite state machine, in which, however, the structure of the native program code is retained. The remaining parts of the native program code are embedded in the FSM structure of the intermediate representation 3. These so-called code parts of the intermediate representation 3 are then also automatically converted into FSM parts in a further step 4. This creates a finite state machine that completely represents the native program code and in which the structure of the native program code is retained.

The specified environment model is taken into account at the latest when translating this finite state machine into a model checker representation of the software component, such that the model checker representation is limited by the boundary conditions of the environment model.

The system 10 according to the present invention further comprises a requirements module 6 for specifying a formal requirement for a model checking method. A formal requirement often comprises a plurality of criteria, such as a formal description of the driving situations along with safety-related requirements and rules that the implemented function must comply with. The requirements module 6 is advantageously designed such that it can automatically modify the formal requirements according to defined specifications, for example by successively changing limit values or by reading out previously defined formal requirements from a database.

A model checking method is applied to the model checker representation in a model checker module 5 of the system 10 and is used to analyze the software component with respect to whether a formal requirement, which was specified by means of the requirements module 6, is complied with in all possible constellations and situations. This testing is particularly suitable for finding so-called edge or corner cases, i.e. very rare but possible scenarios for which there is often no test data available.

The model checker module 5 is designed to identify at least one part of the native program code of the software component to which the non-compliance is attributable if the formal requirement is not complied with. Furthermore, the model checker module 5 is designed to indicate the states and state transitions of the software component that have contributed to non-compliance with the formal requirement. This information is referred to as edge case parameters, as it describes the edge case scenario.

To output the results of the model checker analysis, the system 10 comprises an output module, in this case blocks 8 and 9. Block 8 shows whether or not the software component complies with the specified formal requirement.

If the specified formal requirement is not complied with, block 9 provides the corresponding edge case parameters that describe the critical driving situation in which the software component does not meet the specified formal requirements. According to the present invention, test data for the detected edge case are generated on the basis of these edge case parameters. For this purpose, the system 10 described here comprises a simulation module 11.

If the formal requirement is complied with, the formal requirement is modified using the requirements module 6 and/or the environment model is modified using the environment modeling module 7, in order to then test the software component again with these modified requirements or boundary conditions. In this way, edge cases can be specifically “provoked” and identified in order to generate corresponding test data.

In the case of a software component for planning a lane change or an overtaking maneuver, for example, the minimum distances to be maintained from the vehicle in front and/or behind and/or the relative speeds to be maintained to other vehicles could be changed as a formal requirement.

Figure 2:
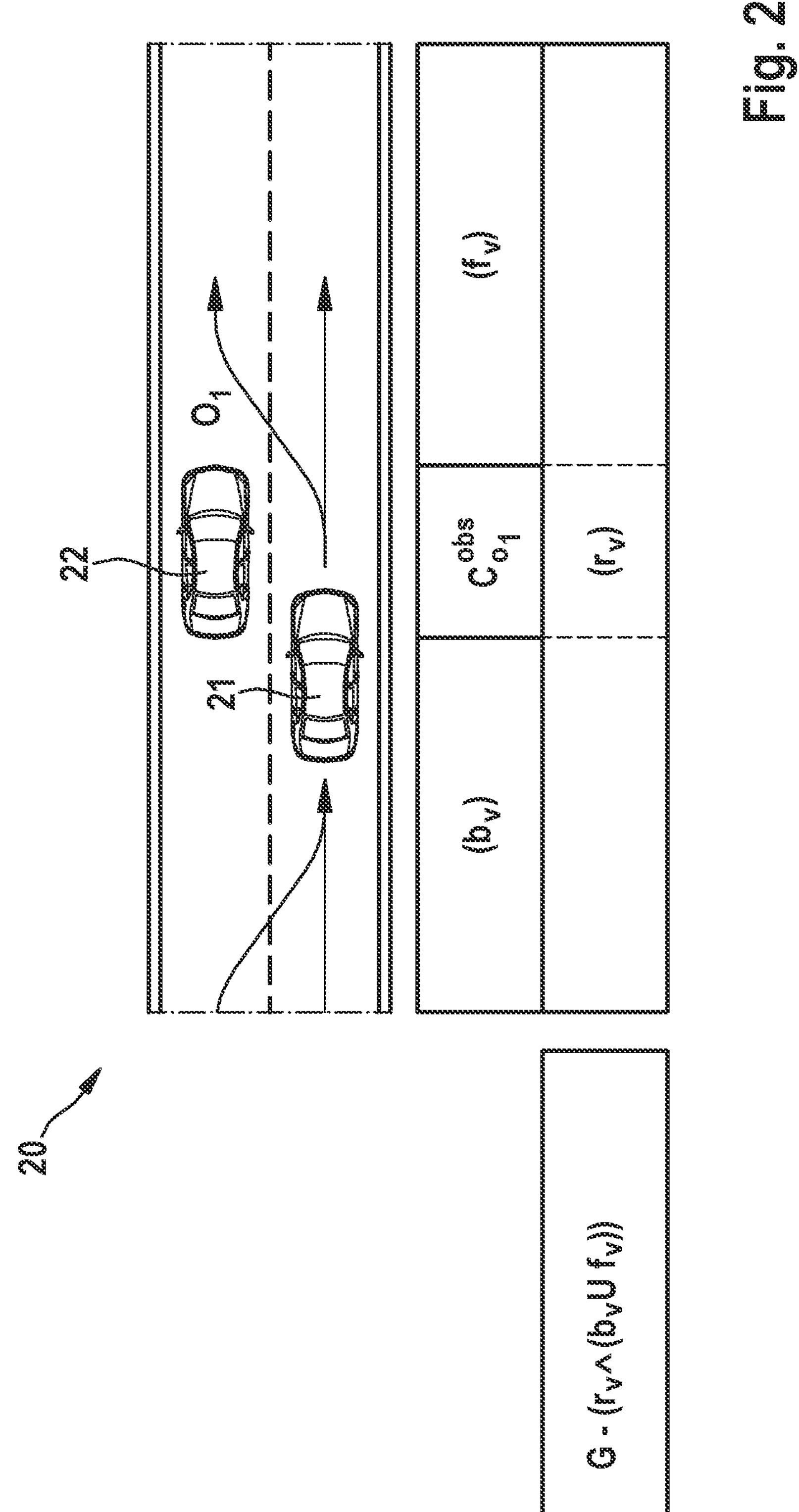
FIG. 2 illustrates a temporal-logical formula for representing a prohibition on overtaking on the right.

FIG. 2 refers to an application example for the method or system according to the present invention and illustrates a temporal-logical formula for representing a prohibition on overtaking on the right.

In model checking, requirements—the formal requirement R—are specified in temporal logic.

If, for example, it is necessary to check whether a behavior planner observes the prohibition on an overtaking maneuver on the right in all possible constellations of a traffic situation 20, a corresponding formal requirement R could be expressed by the formula in FIG. 2. This formula states: “It must always apply (G=globally) that the ego vehicle 21 is not to the right of another vehicle 22 (rv) and drives behind it (bv) until it finally drives in front of it (fv; U=until).”

If this formal requirement R is not fulfilled by a behavior planner, i.e. if the software code of the behavior planner contains logic that can lead to a violation of the formal requirement in certain situations, the model checker provides a “counterexample,” i.e. a traffic situation with its time sequence and the associated interventions by the behavior planner that lead to non-compliance with the formal requirement R.

As intended, model checking is used to analyze and check the correctness of a software component, such as a behavior planner. The results are then either used as proof of correctness or used to correct the software component.

In contrast, the present invention is aimed at the traffic situation that is generated as part of the counterexample. The positions, speeds and possibly other movement variables of the dynamic objects, in particular the road users in the scene, the topology of the road and surroundings and the temporal change in the situation/scene serve as the basis for generating one or more scenarios with the corresponding test data, which can subsequently also be used in other contexts, for example in simulation tests.

In the case of the prohibition on overtaking on the right described above, model checking could be used to generate a situation as a counterexample, in which the behavior planner provides for an overtaking maneuver on the right with a gap of one lane. This is prohibited, but may have been overlooked when implementing the planner. The generated traffic situation can now be used to create a simulation scenario that corresponds to the problematic case in terms of topology and the positions/speeds etc. of the ego vehicle and the other vehicles. According to the present invention, test data are generated for this scenario, such that they can be included in the test catalog of automated driving functions, in order to contribute to better test coverage.

What is claimed is:

1. A computer-implemented method for generating test data for computer-implemented automated driving functions, the method comprising performing, with a processor system that includes at least one processor, the following steps:

a) converting, by the processor system, a computer-implemented automated driving function in the form of a software component into a finite state machine (FSM) that defines states of the software component and state transitions between the states and that is constrained by a given environment model that specifies boundary conditions that limit states and state transitions of the FSM that can be traversed;

b) performing, by the processor system, model checking by automatically traversing in a systematic manner all of the states and state transitions of the FSM, as constrained by the limit, at least until at least one of one or more specified formal requirements is identified to be violated;

c) checking, by the processor system and during the traversing, whether any of the one or more specified formal requirements is violated in any of the traversed states or state transitions;

d) in response to identifying that one of the formal requirements is violated:

(I) recording, by the processor system, a counterexample trace includes a sequence of the states and state transitions that lead to the violation, the counterexample trace forming edge case parameters; and (II) modifying, by the processor system, the counterexample trace to generate a test simulation in a simulation-scenario format that is executable in a driving simulator and that instantiates the edge case parameters as a simulation characterizing a set of environment and vehicle conditions; and e) executing, by the processor system, the test simulation in the driving simulator to test the software component or of a different component of an automated driving system.

2. The method according to claim 1, wherein, when the one or more specified formal requirements are complied with, at least one of the formal requirements is responsively modified in a defined manner and the checking is performed again to the FSM of the software component.

3. The method according to claim 1, further comprising:

in response to a first iteration of step (b) and step (c) in which none of the one or more specified formal requirements is identified to be violated, automatically modifying, by the processor system, the obtained environment model in a defined manner to generate a modified environment model, and repeating steps (b) and (c) using the modified environment model to constrain traversal of the states and state transitions of the FSM.

4. The method according to claim 3, wherein the environment model is specified in the form of an environment model program code and environment parameters, and wherein the environment model is modified by modifying the environment program code and/or the environment parameters in the defined manner.

5. A computer-implemented system for generating test data for computer-implemented automated driving functions, the system comprising a processor system that includes at least one processor and that is programmed to:

a) convert a computer-implemented automated driving function in the form of a software component into a finite state machine (FSM) that defines states of the software component and state transitions between the states and that is constrained by a given environment model that specifies boundary conditions that limit states and state transitions of the FSM that can be traversed;

b) perform model checking by automatically traversing in a systematic manner all of the states and state transitions of the FSM, as constrained by the limit, at least until at least one of one or more specified formal requirements is identified to be violated;

c) check, during the traversing, whether any of the one or more specified formal requirements is violated in any of the traversed states or state transitions;

d) in response to identifying that one of the formal requirements is violated:

(I) record a counterexample trace that includes a sequence of the states and state transitions that lead to the violation, the counterexample trace forming edge case parameters; and (II) modify the counterexample trace to generate a test simulation in a simulation-scenario format that is executable in a driving simulator and that instantiates the edge case parameters as a simulation characterizing a set of environment and vehicle conditions; and e) execute the test simulation in the driving simulator to test the software component or a different component of an automated driving system.

* * * * *